(12) United States Patent
Kuwahara et al.

(10) Patent No.: US 8,602,940 B2
(45) Date of Patent: Dec. 10, 2013

(54) DRIVING FORCE TRANSMISSION DEVICE (75) Inventors: Takashi Kuwahara, Isehara (JP);
Terumasa Hidaka, Chigasaki (JP);
Norihiro Takemoto, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/698,160

(22) PCT Filed: May 20, 2011

(86) PCT No.: PCT/JP2011/061654
§ 371 (c)(1),
(2), (4) Date: Nov. 15, 2012

(87) PCT Pub. No.: WO2011/145724
PCT Pub. Date: Nov. 24, 2011

(65) Prior Publication Data
US 2013/0059695 A1  Mar. 7, 2013

(30) Foreign Application Priority Data
May 20, 2010  (JP) .................................. 2010-115863

(51) Int. Cl.
*B60W 10/02* (2006.01)
(52) U.S. Cl.
USPC ......................................................... 477/86
(58) Field of Classification Search
USPC ........................................... 477/86, 174, 180
See application file for complete search history.

(56) References Cited

U.S. PATENT DOCUMENTS

| | | | |
|---|---|---|---|
| 7,798,941 B2* | 9/2010 | Bai | 477/180 |
| 2009/0100965 A1 | 4/2009 | Sanji et al. | |
| 2009/0305847 A1* | 12/2009 | Klump et al. | 477/86 |
| 2010/0062899 A1* | 3/2010 | Engelmann et al. | 477/86 |
| 2011/0220451 A1 | 9/2011 | Kuwahara et al. | |
| 2011/0221292 A1 | 9/2011 | Kuwahara et al. | |

FOREIGN PATENT DOCUMENTS

| | | |
|---|---|---|
| JP | 06-341462 A | 12/1994 |
| JP | 2006-137406 A | 6/2006 |
| JP | 2006-298272 A | 11/2006 |
| JP | 2007-001457 A | 1/2007 |
| WO | WO 2009/050921 A1 | 3/2009 |
| WO | WO 2010/061855 A1 | 6/2010 |
| WO | WO 2010/061856 A1 | 6/2010 |

\* cited by examiner

*Primary Examiner* — Edwin A Young
(74) *Attorney, Agent, or Firm* — Foley & Lardner LLP (57) ABSTRACT

A hybrid driving force transmission device includes an engine (E), a motor-clutch unit (MC), and a transmission unit (T). The motor-clutch unit (MC) is coupled to the engine (E), and includes a multi-plate dry clutch (7) and a slave cylinder (8). The transmission unit (T) is coupled to the motor-clutch unit (MC), and includes a transmission housing (41), a V-belt type continuously variable transmission mechanism (42), and an oil pump (OP). A cylinder housing (81) which comprises a first clutch pressure oil passage (85) communicating with the slave cylinder (8) is provided in the motor-clutch unit (MC). By coupling the motor-clutch unit (MC), a second clutch pressure oil passage (47) is brought into communication with the first clutch pressure oil passage (85) in the cylinder housing (81). An end plate (45) having the second clutch pressure oil passage (47) is provided in the transmission unit (T).

5 Claims, 6 Drawing Sheets

DRIVING FORCE TRANSMISSION DEVICE

TECHNICAL FIELD

The present invention relates to a driving force transmission device in which a driving source, a clutch unit and a transmission unit are coupled.

BACKGROUND ART

As a hybrid driving force transmission device, there has heretofore been known one in which an engine, a motor clutch unit and a transmission unit are coupled, as disclosed in Japanese Patent Application Publication No. 2006-137406. Among these, the motor clutch unit includes a clutch hub coupled to an output shaft of the engine, a clutch cover having a rotor of an electric motor fixed thereto, and coupled to a transmission input shaft, a multi-plate dry clutch interposed between the clutch hub and the clutch cover, and a slave cylinder (generally called a "CSC." Note that "CSC" is an abbreviation for Concentric Slave Cylinder) for hydraulically controlling the engaging and disengaging of the multi-plate dry clutch.

SUMMARY OF INVENTION

However, the conventional hybrid driving force transmission device has a configuration in which the slave cylinder is disposed between the clutch hub and the engine, i.e., on the engine side. This configuration leads to a layout in which the slave cylinder and the transmission unit are spaced apart in an axial direction. For this reason, a hydraulic source for the motor clutch unit is provided separately from a hydraulic source for the transmission unit. This leads to a problem that the hydraulic source specifically for the motor clutch unit is required.

The present invention has been made in consideration of the foregoing problem. It is an object of the present invention to provide a driving force transmission device capable of supplying a hydraulic pressure of a transmission unit to a clutch unit by means of a simple configuration without the need to provide a hydraulic source specifically for the clutch unit.

To achieve the foregoing object, a driving force transmission device according to the present invention includes a driving source, a clutch unit and a transmission unit. In the driving force transmission device, a hydraulic passage to a hydraulic cylinder is formed by coupling a cylinder housing provided in the clutch unit to a hydraulic part provided in the transmission unit.

The clutch unit is coupled to the driving source, and includes a clutch configured to connect or disconnect driving force transmitted from the driving source, and a hydraulic cylinder configured to hydraulically control the engaging and disengaging of the clutch.

The transmission unit is coupled to the clutch unit, and includes a transmission housing, a transmission mechanism built in the transmission housing, and a hydraulic source configured to generate a hydraulic pressure to required portions.

The cylinder housing is provided in the clutch unit, and has a first hydraulic passage to the hydraulic cylinder.

The hydraulic part is provided in the transmission unit, and has a second hydraulic passage brought into communication with the first hydraulic passage in the cylinder housing by coupling the clutch unit thereto.

Thus, by coupling the transmission unit to the clutch unit, the second hydraulic passage in the hydraulic part is brought into communication with the first hydraulic passage in the cylinder housing, thereby forming a hydraulic passage to the hydraulic cylinder. The hydraulic part having the second hydraulic passage is provided in the transmission unit having the hydraulic source configured to generate the hydraulic pressure to the required portions.

With this configuration, the hydraulic source in the transmission unit can be used also as a hydraulic source for the hydraulic cylinder configured to hydraulically control the engaging and disengaging of the clutch. More specifically, when the clutch is engaged, pressurized oil from the hydraulic source can be supplied to the hydraulic cylinder through the second hydraulic passage and the first hydraulic passage. On the other hand, when the clutch is disengaged, the pressurized oil in the hydraulic cylinder can be discharged to the hydraulic source side (such as an oil tank) through the first hydraulic passage and the second hydraulic passage.

Thus, the hydraulic pressure of the transmission unit can be supplied to the clutch unit by means of a simple configuration without the need to provide a hydraulic source specifically for the clutch unit.

DESCRIPTION OF EMBODIMENTS

A configuration to implement a driving force transmission device of the present invention is described below based on an embodiment shown in the drawings.

[Embodiment]

A configuration is first described.

Figure 1:
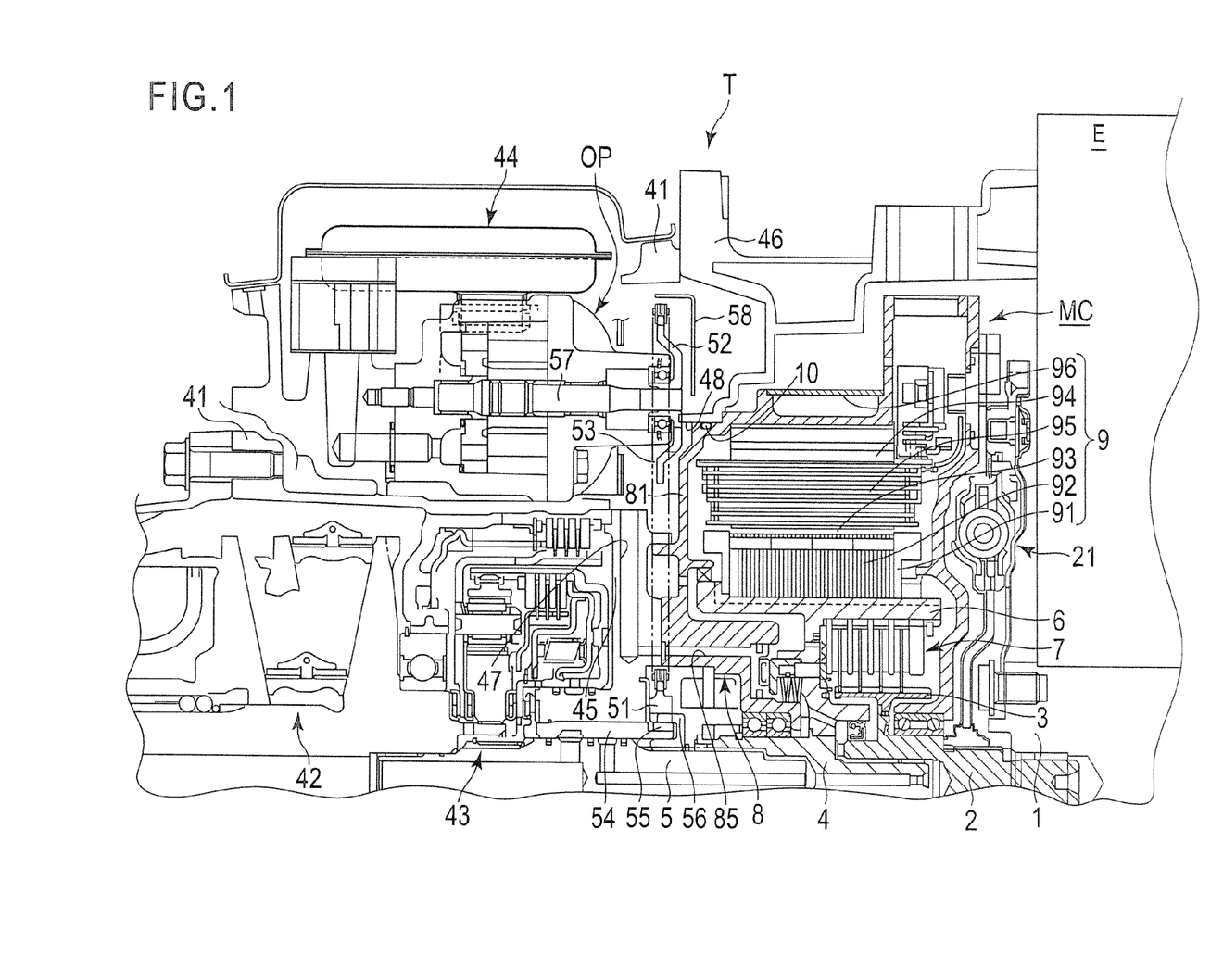
FIG. 1 is an overall schematic view showing a hybrid driving force transmission device (an example of a driving force transmission device) of an embodiment.

FIG. 1 is an overall schematic view showing a hybrid driving force transmission device (an example of a driving force transmission device) of an embodiment. With reference to FIG. 1, an overall configuration of the hybrid driving force transmission device is described below.

As shown in FIG. 1, the hybrid driving force transmission device of the embodiment includes an engine E (driving source), a motor-clutch unit MC (clutch unit), a transmission unit T, an engine output shaft 1, a clutch hub shaft 2, a clutch hub 3, a clutch cover shaft 4, a transmission input shaft 5, a clutch cover 6, a multi-plate dry clutch 7 (clutch), and a slave cylinder 8 (hydraulic cylinder).

In the hybrid driving force transmission device of the embodiment, when the normal open multi-plate dry clutch 7 is disengaged, a motor generator 9 and the transmission input shaft 5 are coupled through the clutch cover 6 and the clutch cover shaft 4 to set an "electric vehicle drive mode." When the multi-plate dry clutch 7 is hydraulically engaged by the slave cylinder 8, the engine E and the motor generator 9 are coupled and the engine output shaft 1 and the clutch hub shaft 2 are coupled through a damper 21. Then, the clutch hub 3 and the clutch cover 6 are coupled through the multi-plate dry clutch 7 to set a "hybrid vehicle drive mode."

The motor-clutch unit MC (region indicated by cross-sectional hatching in FIG. 1) includes the multi-plate dry clutch 7, the slave cylinder 8 and the motor generator 9. The multi-plate dry clutch 7 is coupled to the engine E, and disconnects or connects driving force transmitted from the engine E. The slave cylinder 8 hydraulically controls the engaging and disengaging of the multi-plate dry clutch 7. The motor generator 9 is disposed at a periphery of the clutch cover 6 of the multi-plate dry clutch 7, and transmits power to the transmission input shaft 5. In the motor-clutch unit MC, a cylinder housing 81 having a first clutch pressure oil passage 85 (first hydraulic passage) communicating with the slave cylinder 8 is provided while maintaining sealing properties with an O-ring 10.

The motor generator 9 is a synchronous alternating-current motor, and includes a rotor supporting frame 91 formed integrally with the clutch cover 6, and a motor rotor 92 supported and fixed to the rotor supporting frame 91 and having a permanent magnet buried therein. The motor generator 9 also includes a motor stator 94 placed over the motor rotor 92 with an air gap 93 in between and fixed to the cylinder housing 81, and a stator coil 95 wound around the motor stator 94. Note that a water jacket 96 for distributing cooling water is formed in the cylinder housing 81.

The transmission unit T is coupled to the motor-clutch unit MC, and includes a transmission housing 41, a V-belt type continuously variable transmission mechanism 42 (transmission mechanism), and an oil pump OP (hydraulic source). The V-belt type continuously variable transmission mechanism 42 is built in the transmission housing 41, has a V-belt wound between two pulleys, and obtains a continuously variable transmission gear ratio by changing a belt contact diameter. The oil pump OP is a hydraulic source to send oil to required portions, and guides, to the required portions, a hydraulic pressure from a control valve (not shown) to control a transmission hydraulic pressure to a pulley chamber, a clutch/brake hydraulic pressure or the like, using an oil pump pressure as a source pressure. The transmission unit T is further provided with a forward/backward switching mechanism 43, an oil filter 44, an end plate 45 (hydraulic part) and a clutch unit case 46. The clutch unit case 46 is integrally fixed to the transmission housing 41. The end plate 45 has a second clutch pressure oil passage 47 (second hydraulic passage).

The oil pump OP drives a pump by transmitting rotary drive torque of the transmission input shaft 5 through a chain drive mechanism. The chain drive mechanism includes a drive side sprocket 51 configured to rotate along with the rotary drive of the transmission input shaft 5, a driven side sprocket 52 configured to drive a pump shaft 57 to rotate, and a chain 53 wound around the both sprockets 51 and 52. The drive side sprocket 51 is provided between the transmission input shaft 5 and the end plate 45, and is rotatably supported on a stator shaft 54 fixed to the transmission housing 41 by means of a bush 55. The rotary drive torque from the transmission input shaft 5 is transmitted through a first adapter 56 which is fitted to the transmission input shaft 5 in a spline manner and fitted to the drive side sprocket 51 with a claw.

Figure 2:
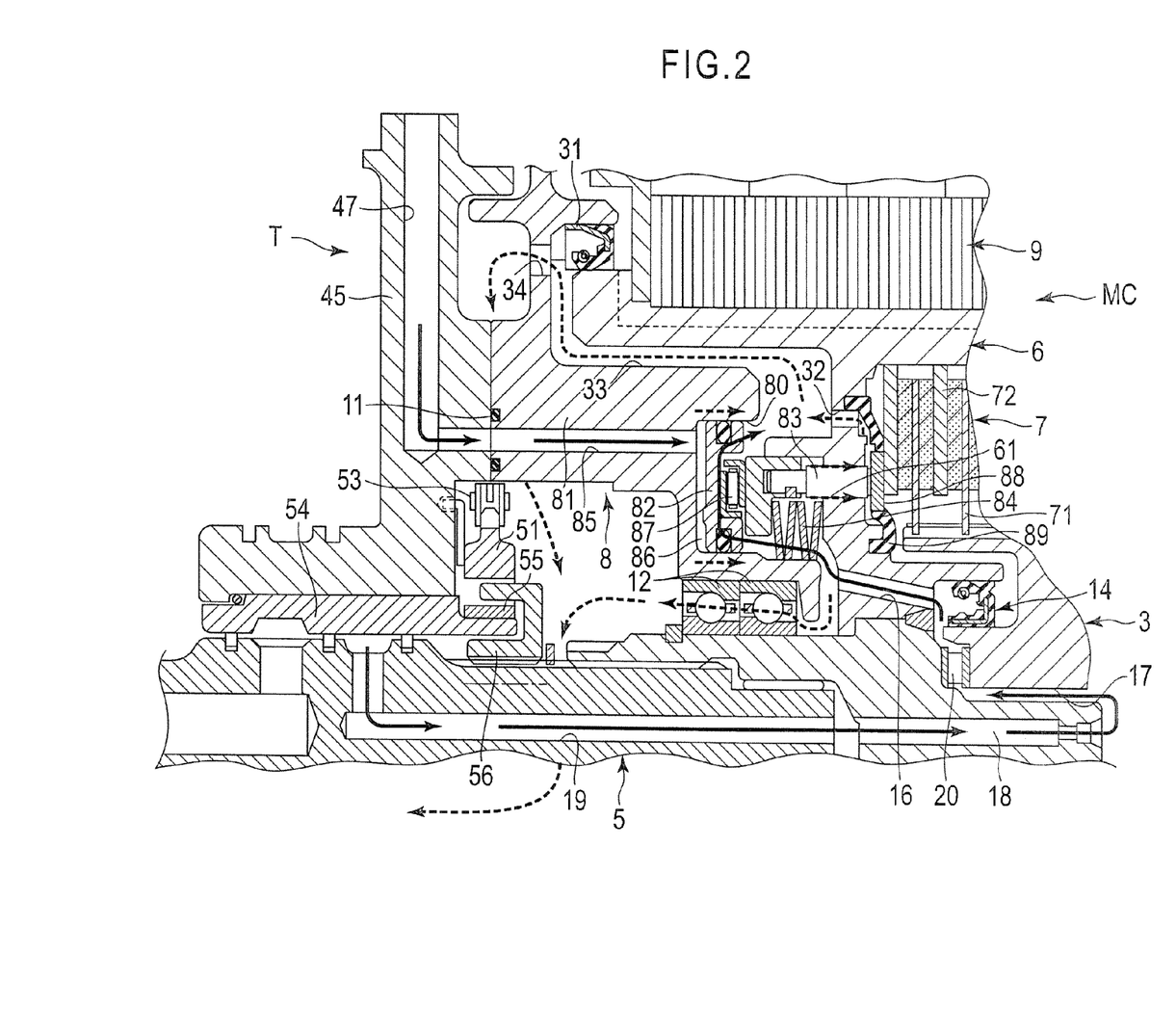
FIG. 2 is a cross-sectional view showing a main part of a multi-plate dry clutch in the hybrid driving force transmission device of the embodiment.
Figure 3:
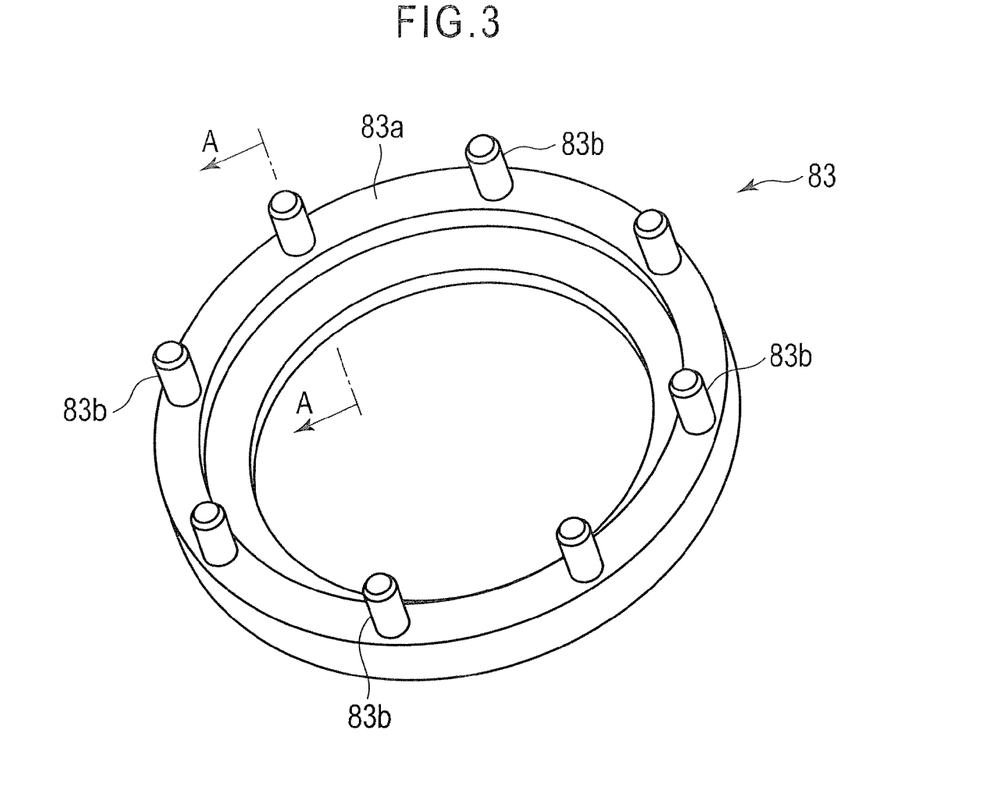
FIG. 3 is a perspective view showing a piston arm of the multi-plate dry clutch of the embodiment.
Figure 4:
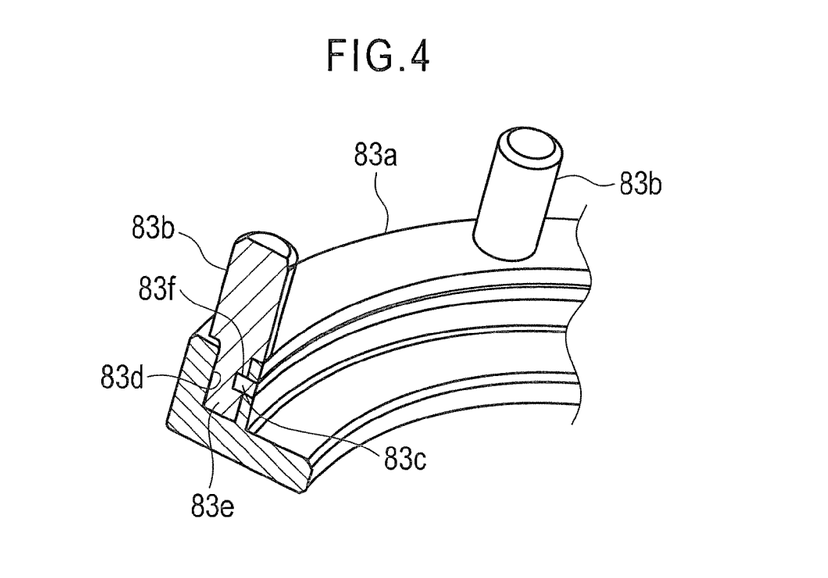
FIG. 4 is a cross-sectional view taken along the line A-A in FIG. 3, showing the piston arm of the multi-plate dry clutch of the embodiment.

FIG. 2 is a cross-sectional view showing a main part of the multi-plate dry clutch in the hybrid driving force transmission device of the embodiment. FIG. 3 is a perspective view showing a piston arm of the multi-plate dry clutch. FIG. 4 is a cross-sectional view taken along the line A-A in FIG. 3, showing the piston arm. With reference to FIGS. 2 to 4, a main part configuration of the multi-plate dry clutch 7 is described below.

The clutch hub 3 is coupled to the engine output shaft 1 of the engine E. As shown in FIG. 2, a drive plate 71 (first friction engaging element) of the multi-plate dry clutch 7 is splined to the clutch hub 3.

The clutch cover 6 is coupled to the transmission input shaft 5 in the transmission unit T. As shown in FIG. 2, a driven plate 72 (second friction engaging element) of the multi-plate dry clutch 7 is splined to the clutch cover 6.

The multi-plate dry clutch 7 is interposed between the clutch hub 3 and the clutch cover 6 in a state of having multiple drive plates 71 and driven plates 72 alternately arranged. More specifically, engaging the multi-plate dry clutch 7 allows for torque transmission between the clutch hub 3 and the clutch cover 6, while disengaging the multi-plate dry clutch 7 disconnects the torque transmission between the clutch hub 3 and the clutch cover 6.

The slave cylinder 8 is a hydraulic actuator configured to control the engaging and disengaging of the multi-plate dry clutch 7, and is disposed between the transmission unit T side and the clutch cover 6. As shown in FIG. 2, the slave cylinder 8 includes a piston 82 slidably provided in a cylinder hole 80 in the cylinder housing 81, a first clutch pressure oil passage 85 formed in the cylinder housing 81 and configured to guide a clutch pressure produced by the transmission unit T, and a cylinder oil chamber 86 communicating with the first clutch pressure oil passage 85. Between the piston 82 and the multi-plate dry clutch 7, not only a piston arm 83 but also a needle bearing 87, a return spring 84 and a pressure plate 88 are interposed as shown in FIG. 2.

The piston arm 83 uses the pressure from the slave cylinder 8 to generate a pressing force toward the multi-plate dry clutch 7, and is provided slidably in a through-hole 61 formed in the clutch cover 6. The return spring 84 is interposed between the piston arm 83 and the clutch cover 6, and is formed by combining multiple disc springs. The needle bearing 87 is interposed between the piston 82 and the piston arm 83, and prevents the piston 82 from rotating along with the rotation of the piston arm 83. The pressure plate 88 is provided integrally with an elastic support plate 89, and is elastically supported by the clutch cover 6. The pressure plate 88 and the elastic support plate 89 form a partition elastic member to block leak oil from a sliding part of the piston arm 83 from flowing into the multi-plate dry clutch 7. To be more specific, the pressure plate 88 and the elastic support plate 89, which are tightly fixed at a piston arm attachment position on the clutch cover 6, realize a partition function to divide a wet space with the slave cylinder 8 disposed therein from a dry space with the multi-plate dry clutch 7 disposed therein.

As shown in FIGS. 3 and 4, the piston arm 83 includes a ring-shaped arm body 83a, multiple arm pins 83b provided so as to protrude from the arm body 83a, and a snap ring 83c to fix the arm pins 83b to the arm body 83a. In assembly of the piston arm 83, pin legs 83e of the arm pins 83b are inserted into multiple pin holes 83d formed in the arm body 83a, and ring fitting grooves 83f formed in the pin legs 83e are set to face the center position of the arm body 83a. Thereafter, the snap ring 83c is inserted from inside in a state of being reduced in diameter by applying force thereto, and then the force applied to the snap ring 83c is released to restore the snap ring to its original diameter with elastic restoring force. Thus, the snap ring 83c is fitted to the ring fitting grooves 83f, and at the same time, all the arm pins 83b are fixed to the arm body 83a.

As shown in FIG. 2, a leak oil recovery passage in the embodiment includes first bearings 12, 12, a first seal member 31, a leak oil passage 32, a first oil recovery passage 33 and a second oil recovery passage 34. More specifically, the leak oil recovery passage is a circuit to return the leak oil from the sliding part of the piston 82 to the transmission unit T through the first and second oil recovery passages 33 and 34 tightly sealed by the first seal member 31. Moreover, the leak oil recovery passage is also a circuit to return the leak oil from the sliding part of the piston arm 83, besides the leak oil described above, to the transmission unit T through the leak oil passage 32 tightly sealed by the partition elastic member (the pressure plate 88 and the elastic support plate 89) and the first and second oil recovery passages 33 and 34 tightly sealed by the first seal member 31.

The first bearings 12, 12 rotatably support the clutch cover 6 relative to the cylinder housing 81, and are provided in a pair to prevent a tilt in the shaft of the clutch cover 6. Moreover, in order to prevent a positional shift in the shaft center of the clutch cover 6 relative to the cylinder housing 81, no other objects than the first bearings 12, 12 are interposed between the cylinder housing 81 and the clutch cover 6.

As shown in FIG. 2, the first seal member 31 is disposed downstream of the partition elastic member (the pressure plate 88 and the elastic support plate 89) in the flow direction of the leak oil, and tightly seals between opposed faces of the cylinder housing 81 (stationary member) and the clutch cover 6 (rotary member). The first seal member 31 has a lip seal structure which exerts sealing performance using seal elastic force, and secures stable sealing performance by the first bearings 12, 12 suppressing a positional shift in the shaft center of the clutch cover 6.

As shown in FIG. 2, the leak oil passage 32 is formed so as to penetrate the clutch cover 6 and allow the first oil recovery passage 33 to communicate with a tightly sealed space formed by the partition elastic member (the pressure plate 88 and the elastic support plate 89).

As shown in FIG. 2, the first oil recovery passage 33 is formed of a gap between the cylinder housing 81 and the clutch cover 6. Moreover, the first seal member 31 and the second oil recovery passage 34 are disposed at positions on the outer peripheral side than the sliding parts of the piston 82 and the piston arm 83. Thus, the second oil recovery passage 34 is formed to be an oil passage extending toward the outer periphery from the sliding parts of the piston 82 and the piston arm 83.

As shown in FIG. 2, the second oil recovery passage 34 is formed downstream of the first seal member 31 as a short oil passage in the cylinder housing 81. Meanwhile, a long oil passage upstream of the first seal member 31 is the first oil recovery passage 33 formed of the gap between the cylinder housing 81 and the clutch cover 6.

As shown in FIG. 2, a bearing lubricating oil passage of the embodiment includes a needle bearing 20, a second seal member 14, a first shaft center oil passage 19, a second shaft center oil passage 18 and a lubricating oil passage 16. The bearing lubricating oil passage is for bearing lubrication, in which bearing lubricating oil from the transmission unit T is returned to the transmission unit T through the needle bearing 20, the first bearings 12, 12 rotatably supporting the clutch cover 6 relative to the cylinder housing 81, and the needle bearing 87 interposed between the piston 82 and the piston arm 83.

As shown in FIG. 2, the needle bearing 20 is set between opposed faces of the clutch hub 3 and the clutch cover 6 axially facing each other. The needle bearing 20 restrains the clutch hub 3 and the clutch cover 6 from moving back and forth in the axial direction, and also allows for relative rotation of the clutch hub 3 and the clutch cover 6.

As shown in FIG. 2, the second seal member 14 is interposed between the clutch hub 3 and the clutch cover 6. The second seal member 14 prevents the bearing lubricating oil from flowing from the wet space with the slave cylinder 8 disposed therein into the dry space with the multi-plate dry clutch 7 disposed therein.

The first shaft center oil passage 19 is formed at the shaft center of the transmission input shaft 5. The second shaft center oil passage 18 is formed in the clutch cover 6 and communicates with the first shaft center oil passage 19. The lubricating oil passage 16 is formed in the clutch cover 6 and communicates with the second shaft center oil passage 18 through a gap 17 with the clutch hub 3 and the needle bearing 20.

Figure 5:
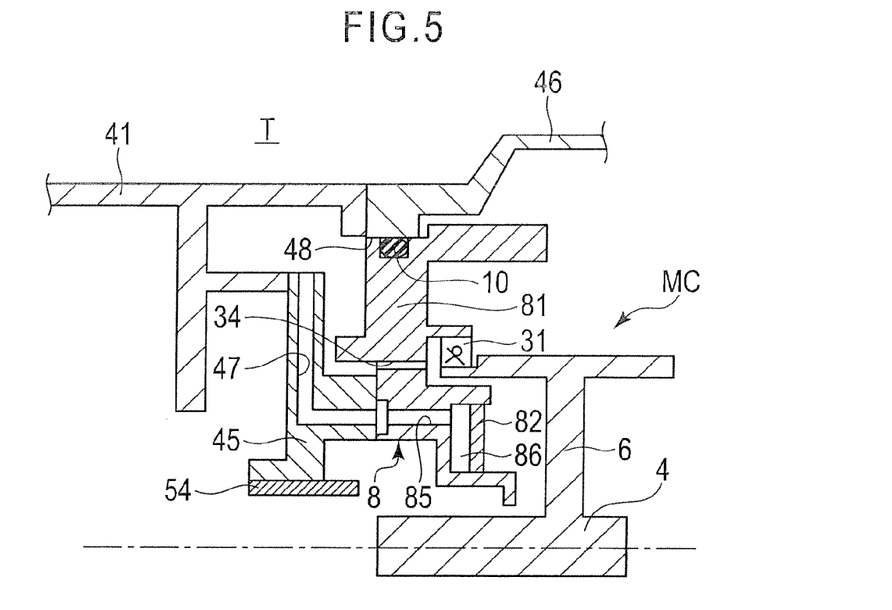
FIG. 5 is a cross-sectional view showing a main part of the hybrid driving force transmission device of the embodiment.
Figure 6:
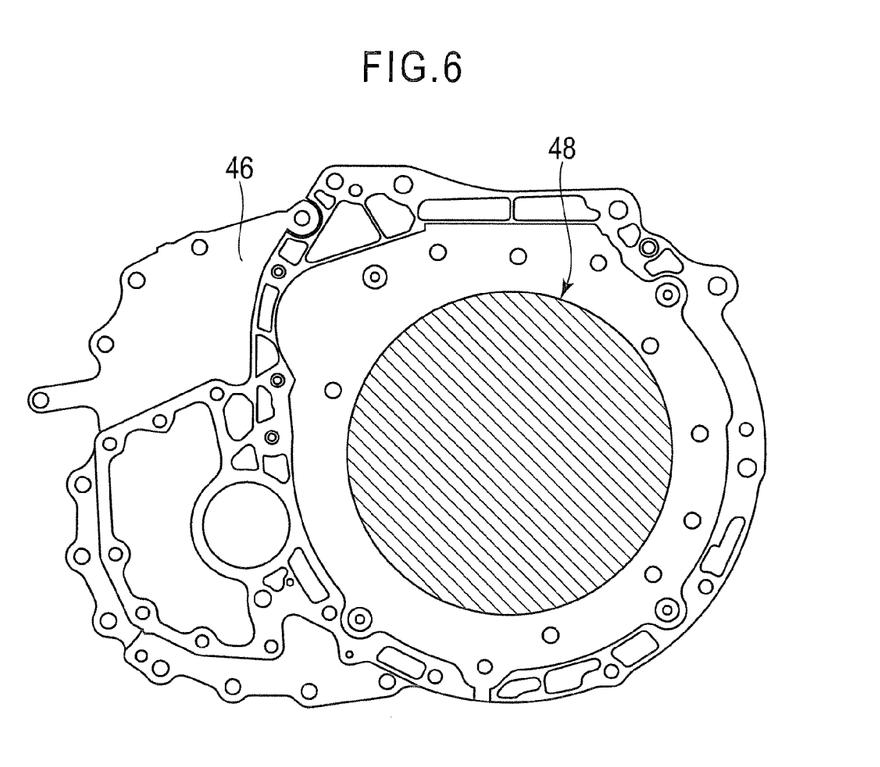
FIG. 6 is a front view showing a motor-clutch unit case of the hybrid driving force transmission device of the embodiment.

FIG. 5 is a schematic view showing a main part of the hybrid driving force transmission device of the embodiment. FIG. 6 is a front view showing a motor-clutch unit case of the hybrid driving force transmission device of the embodiment. The main part configuration of the hybrid driving force transmission device is described below.

As shown in FIG. 6, the clutch unit case 46 having a circular opening 48 in a connection with the motor clutch unit MC is fixed with bolts to the transmission housing 41 of the transmission unit T. As shown in FIG. 5, the O-ring 10 is provided to maintain the sealing performance between the clutch unit case 46 and the cylinder housing 81 of the slave cylinder 8. To be more specific, the motor clutch unit is housed, while maintaining the sealing performance, in the internal space of the clutch unit case 46 integrally fixed to the transmission housing 41.

In the motor clutch unit MC, the cylinder housing 81 is provided, which has the first clutch pressure oil passage 85 (first hydraulic passage) to the slave cylinder 8.

In the transmission unit T, the end plate 45 (hydraulic part) is provided, which has the second clutch pressure oil passage 47 (second hydraulic passage). By coupling the motor clutch unit MC to the transmission unit T, the first clutch pressure oil passage 85 in the cylinder housing 81 is brought into communication with the second clutch pressure oil passage 47 in the end plate 45. In this event, by providing a seal ring 11 in the connection between the both clutch oil passages 47 and 85, the pressure oil passing through the both clutch oil passages 47 and 85 is prevented from leaking from the connection.

Next, operations are described.

First, "Problems in Comparative Embodiment" is described. Then, operations of the hybrid driving force transmission device according to the embodiment are described by classifying the operations into "clutch pressure and leak oil recovery passage setting operation," "hybrid driving force transmission device assembly operation," "clutch control operation by slave cylinder," "leak oil recovery operation from slave cylinder" and "bearing lubrication operation."

[Problems in Comparative Embodiment]

Figure 7:
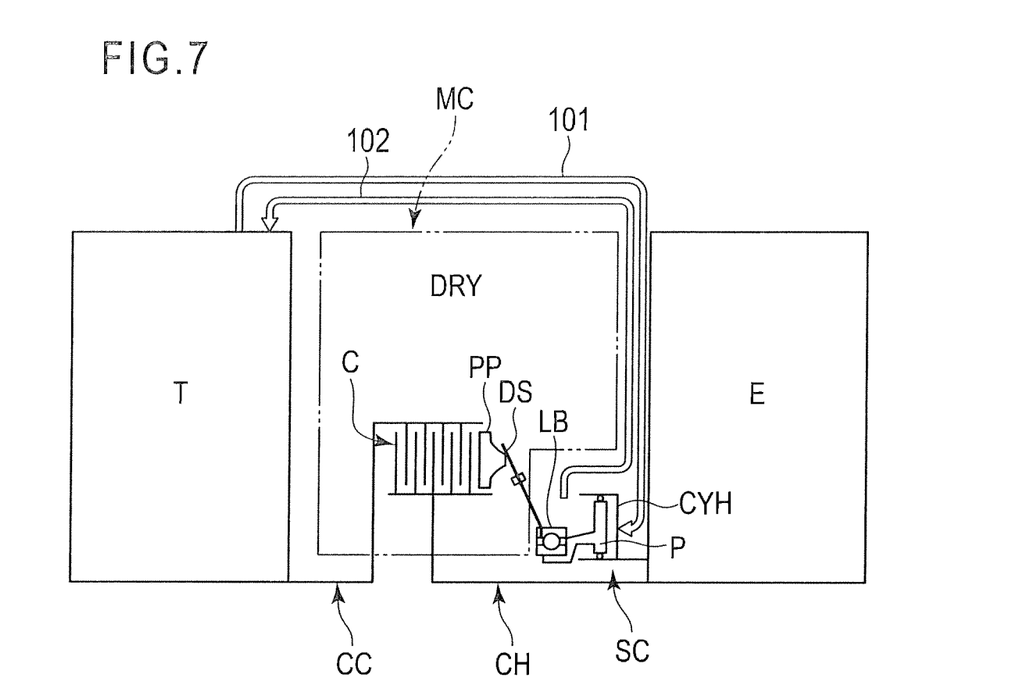
FIG. 7 is an explanatory view schematically showing a basic structure of a hybrid driving force transmission device of a comparative embodiment.

FIG. 7 is an explanatory view schematically showing a basic structure of a hybrid driving force transmission device of a comparative embodiment. The problems in the comparative embodiment are described below.

As shown in FIG. 7, the hybrid driving force transmission device of the comparative embodiment includes a clutch hub CH coupled to an output shaft of an engine E, a clutch cover CC fixed to a rotor of an electric motor and coupled to an input shaft of a transmission, a multi-plate dry clutch C interposed between the clutch hub CH and the clutch cover CC, and a slave cylinder SC configured to control the engaging and disengaging of the multi-plate dry clutch C.

The slave cylinder SC of the comparative embodiment includes a piston P slidably provided in a cylinder housing CYH and a release bearing LB provided at a tip of the piston P. Between the release bearing LB and the multi-plate dry clutch C, a diaphragm spring DS and a pressure plate PP are provided. To control the engaging and disengaging of the multi-plate dry clutch C, the multi-plate dry clutch C is brought into an engaged state by a biasing force of the diaphragm spring DS, and is brought into a disengaged state by a hydraulic pressure of the slave cylinder SC.

However, the hybrid driving force transmission device of the comparative embodiment has the configuration in which the slave cylinder SC is arranged between the clutch hub CH and the engine E, i.e., the configuration in which the engine E, the slave cylinder SC, the clutch hub CH, the multi-plate dry clutch C, the clutch cover CC and the transmission unit T are arranged in this order. Thus, the clutch hub CH, the multi-plate dry clutch C and the clutch cover CC are interposed between the slave cylinder SC and the transmission unit T, and the slave cylinder SC and the transmission unit T are spaced apart in the axial direction. This layout makes it difficult to set a leak oil recovery passage to recover leak oil from a piston sliding portion of the slave cylinder SC and to return the leak oil to the transmission unit T.

To be more specific, in the case of the slave cylinder using high-pressure hydraulic oil, leakage of the hydraulic oil cannot be completely prevented because of the structure. Moreover, between the slave cylinder SC and the transmission unit T, a dry space is formed, in which the multi-plate dry clutch C and an electric motor (not shown) which hate intrusion of the hydraulic oil from the outside are disposed. For this reason, to supply clutch hydraulic pressure from the transmission unit T to the slave cylinder SC, a long clutch pressure oil passage 101 using a pipe and the like needs to be extended from the outer periphery of the housing while avoiding the dry space. Similarly, to return the leak oil in the slave cylinder SC to the transmission, a long recovery oil passage 102 using a pipe and the like needs to be extended from the outer periphery of the housing while avoiding the dry space.

Accordingly, the slave cylinder SC and the transmission unit T are spaced apart in the axial direction, and a hydraulic source for the motor clutch unit is provided separately from that for the transmission unit T. Therefore, the hydraulic source specifically for the motor clutch unit is required.

[Clutch Pressure and Leak Oil Recovery Passage Setting Operation]

Figure 8:
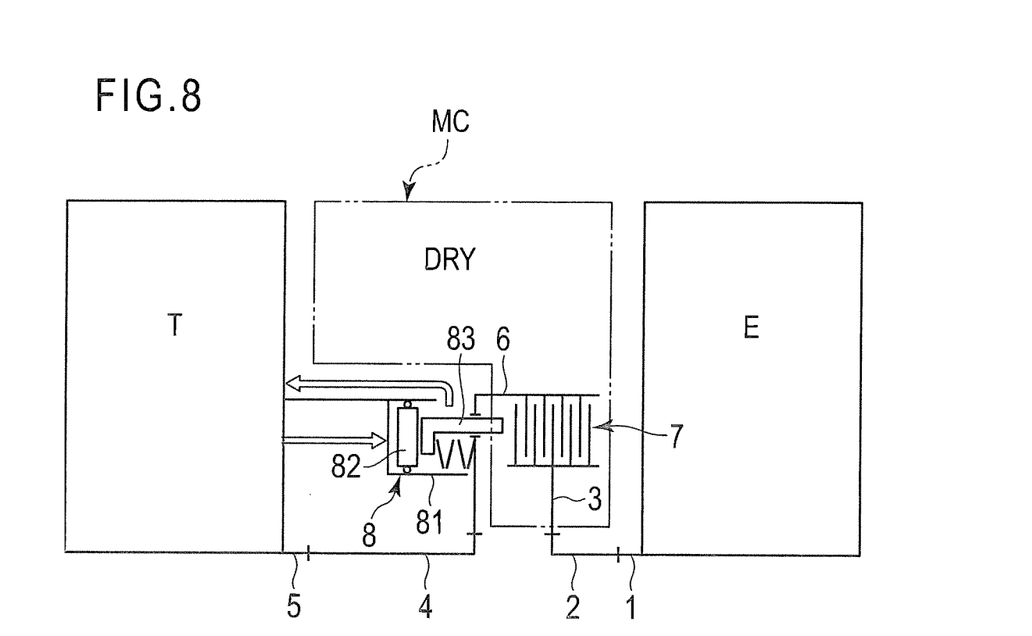
FIG. 8 is an explanatory view schematically showing a basic structure of the hybrid driving force transmission device of the embodiment.

FIG. 8 is an explanatory view schematically showing a basic structure of the hybrid driving force transmission device of the embodiment. An operation of setting a clutch pressure oil passage and a leak oil recovery passage according to the embodiment is described below.

As shown in FIG. 8, the motor clutch unit MC of the embodiment includes the clutch hub 3 coupled to the engine output shaft 1 of the engine E, the clutch cover 6 coupled to the transmission input shaft 5 of the transmission unit T, the multi-plate dry clutch 7 interposed between the clutch hub 3 and the clutch cover 6, and the slave cylinder 8 configured to control the engaging and disengaging of the multi-plate dry clutch 7. In the embodiment, the slave cylinder 8 has the configuration including the piston 82 provided slidably in the cylinder housing 81 and the piston arm 83 provided so as to penetrate the clutch cover 6. This configuration enables a layout in which the slave cylinder 8 is disposed between the transmission unit T and the clutch cover 6.

As described above, by disposing the slave cylinder 8 between the transmission unit T and the clutch cover 6, the engine E, the clutch hub 3, the multi-plate dry clutch 7, the clutch cover 6, the slave cylinder 8 and the transmission unit T are arranged in this order, and the slave cylinder 8 and the transmission unit T are disposed adjacent to each other, as shown in FIG. 8. Thus, to supply the clutch oil pressure from the transmission unit T to the slave cylinder 8, the first clutch pressure oil passage 85 having a short oil passage length only needs to be formed in the cylinder housing 81.

Likewise, the leak oil recovery passage or bearing lubricating oil passage to return the leak oil or bearing lubricating oil to the transmission unit T can be configured simply. The configuration may be as simple as that the leak oil or bearing lubricating oil is returned to the transmission unit T by using the oil passage or a gap while receiving the oil with the first and second seal members 31 and 14 so as to prevent the oil from flowing into the dry space. As a result, unlike the comparative embodiment, the leak oil recovery passage or bearing lubricating oil passage does not have to be extended and can be easily set.

[Hybrid Driving Force Transmission Device Assembly Operation]

Figure 9:
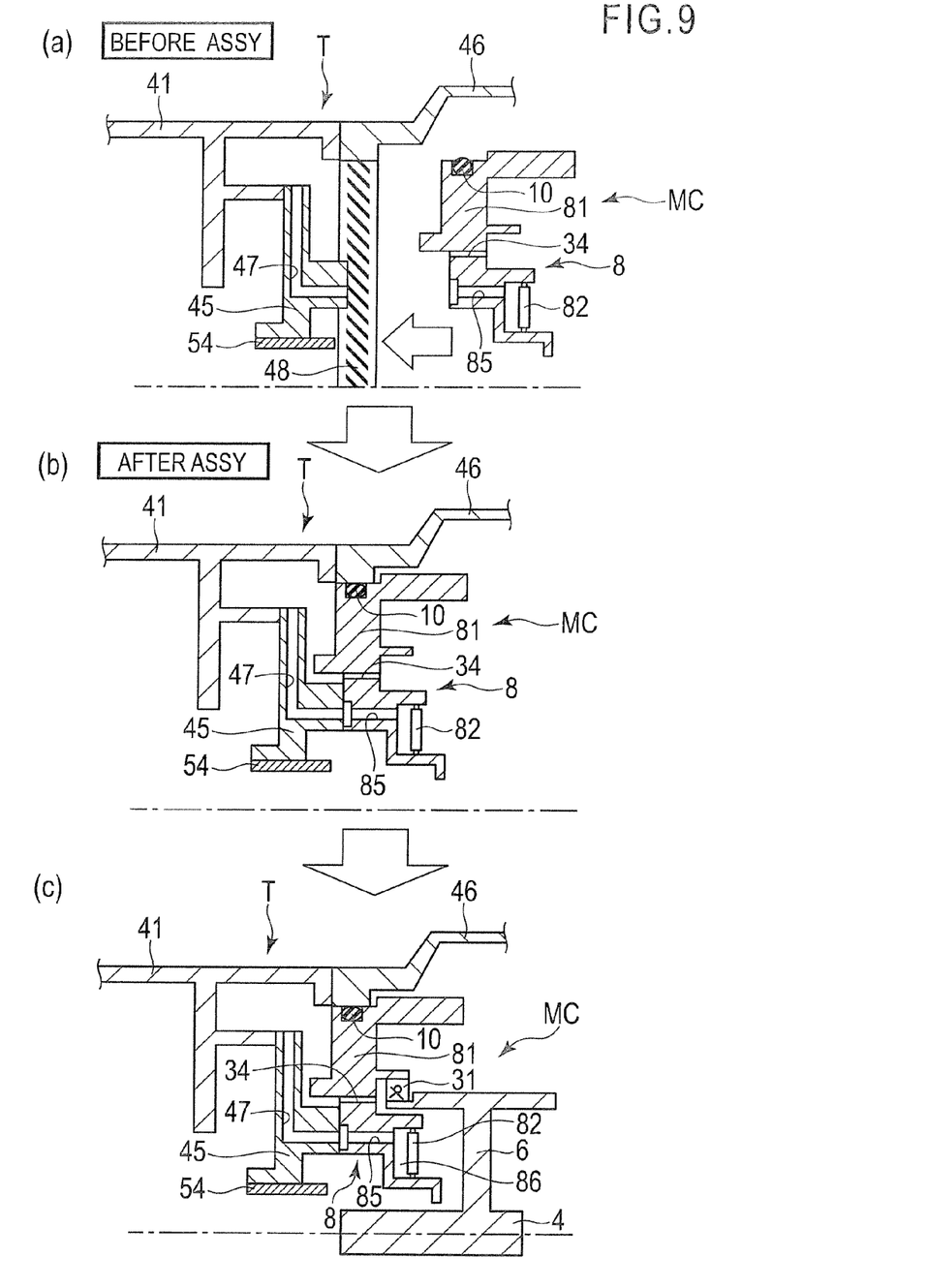
FIG. 9 shows assembly steps (a) to (c) of the hybrid driving force transmission device of the embodiment, (a) showing a state before assembly of a cylinder housing, (b) showing a state after assembly of the cylinder housing, and (c) showing a state where a clutch cover shaft and a clutch cover are assembled.

FIG. 9 shows assembly steps (a) to (c) of the hybrid driving force transmission device of the embodiment, (a) showing a state before assembly of the cylinder housing, (b) showing a state after assembly of the cylinder housing, and (c) showing a state where the clutch hub shaft and the clutch hub are assembled. An assembly operation for the hybrid driving force transmission device is described below.

First, in assembling the motor clutch unit MC onto the already assembled transmission unit T, the cylinder housing 81 is inserted and moved in the axial direction toward the opening 48 in the clutch unit case 46 as shown in FIG. 9(a) before the assembly of the cylinder housing 81. Then, after the assembly of the cylinder housing 81, the cylinder housing 81 of the slave cylinder 8 is assembled, while maintaining the sealing performance with the O-ring 10, to the opening 48 in the clutch unit case 46, as shown in FIG. 9(b). Thereafter, after the assembly of the cylinder housing 81, the clutch cover shaft 4 and the clutch cover 6 are pushed in the axial direction, as shown in FIG. 9(c), thus securing the sealing performance by the first seal member 31.

As described above, by coupling the transmission unit T to the motor clutch unit MC, the second clutch pressure oil passage 47 in the end plate 45 is brought into communication with the first clutch pressure oil passage 85 in the cylinder housing 81, and thus a hydraulic passage to the slave cylinder 8 is formed. Moreover, the end plate 45 having the second clutch pressure oil passage 47 is provided in the transmission unit T having the oil pump OP producing the hydraulic pressure for required portions.

Thus, the oil pump OP in the transmission unit T can be used also as the hydraulic source for the slave cylinder 8 configured to hydraulically control the engaging and disengaging of the multi-plate dry clutch 7. To be more specific, when the multi-plate dry clutch 7 is engaged, pressurized oil from the oil pump OP can be supplied to the slave cylinder 8 through the second clutch pressure oil passage 47 and the first clutch pressure oil passage 85. On the other hand, when the multi-plate dry clutch 7 is disengaged, the pressurized oil in the slave cylinder 8 can be discharged to the oil filter 44 through the first clutch pressure oil passage 85 and the second clutch pressure oil passage 47.

Thus, the hydraulic pressure of the transmission unit T can be supplied to the motor clutch unit MC by means of a simple configuration without the need to provide a hydraulic source specifically for the motor clutch unit MC. As a modified example of the assembly order, the hybrid driving force transmission device may be assembled in an order different from that shown in FIG. 9. For example, before the assembly of the motor clutch unit MC onto the transmission unit T, as shown in FIGS. 9(*a*) and 9(*b*), the clutch cover shaft 4 and the clutch cover 6 may be assembled onto the motor clutch unit MC, and then the motor clutch unit MC may be assembled, together with the clutch cover shaft 4 and the clutch cover 6, onto the transmission unit T.

[Clutch Control Operation by Slave Cylinder]

With reference to FIG. 2, description is given of a clutch control operation to engage and disengage the multi-plate dry clutch 7 by the slave cylinder 8.

In engaging the multi-plate dry clutch 7 by the slave cylinder 8, the clutch hydraulic pressure produced by the transmission unit T is supplied to the cylinder oil chamber 86 through the first clutch pressure oil passage 85 formed in the cylinder housing 81. Accordingly, hydraulic pressure force obtained by multiplying the hydraulic pressure by the area that receives the pressure acts on the piston 82 and causes the piston 82 to make a stroke to the right in FIG. 2 against the biasing force of the return spring 84 interposed between the piston arm 83 and the clutch cover 6. Then, the engaging force obtained by a difference between the hydraulic pressure force and the biasing force is transmitted to the piston 82, the needle bearing 87, the piston arm 83 and the pressure plate 88 in this order. Then, the engaging force pressurizes the drive plate 71 and the driven plate 72, thereby engaging the multi-plate dry clutch 7.

In disengaging the multi-plate dry clutch 7 in the engaged state, the hydraulic oil supplied to the cylinder oil chamber 86 is taken out into the transmission unit T through the clutch pressure oil passage 85, thereby lowering the hydraulic pressure acting on the piston 82. Accordingly, the biasing force of the return spring 84 exceeds the hydraulic pressure and causes the piston arm 83 to make a stroke to the left in FIG. 2. As a result, the engaging force transmitted to the pressure plate 88 is released, and thus the multi-plate dry clutch 7 is disengaged.

[Leak Oil Recovery Operation from Slave Cylinder]

Since the multi-plate dry clutch 7 is engaged by supplying the high clutch hydraulic pressure to the cylinder oil chamber 86 in the slave cylinder 8 as described above, the hydraulic oil cannot be prevented from leaking from the sliding part of the piston 82 or the sliding part of the piston arm 83 due to deformation of the piston seal or the like.

Therefore, a leak oil recovery passage to recover the hydraulic oil leaking from the sliding part of the piston 82 by returning the oil to the transmission unit T, and a leak oil recovery passage to recover the hydraulic oil leaking from the sliding part of the piston arm 83 by returning the oil to the transmission unit T are required. With reference to FIG. 2, description is given below of a leak oil recovery operation for the hydraulic oil leaking from the sliding part of the piston 82, and a leak oil recovery operation for the hydraulic oil leaking from the sliding part of the piston arm 83.

First, description is given of the leak oil recovery operation for the hydraulic oil leaking from the sliding part of the piston 82.

If the hydraulic oil leaks from the sliding part of the piston 82 in the slave cylinder 8 when the clutch cover 6 is rotated, such as during driving, centrifugal force acts on the leak oil. The centrifugal force moves the leak oil in the outside diameter direction, as indicated by the dotted arrow in FIG. 2, through the first recovery oil passage 33 formed of a gap between the cylinder housing 81 and the clutch cover 6. However, the leak oil moved in the outside diameter direction is sealed by the first seal member 31 interposed between the cylinder housing 81 and the clutch cover 6, and is prevented from entering into the dry space in which the motor generator 9 and the multi-plate dry clutch 7 are disposed. Then, the leak oil in the outside diameter direction is moved toward the inside diameter direction through the second recovery oil passage 34 formed in the cylinder housing 81, and is then returned to the transmission unit T.

Some of the leak hydraulic oil from the sliding part of the piston 82 in the slave cylinder 8, i.e., the leak oil flowing in the inside diameter direction under little influence of the centrifugal force is returned to the transmission unit T through the return spring 84 and the first bearings 12, 12.

Therefore, the leak oil from the sliding part of the piston 82 can be recovered to the transmission unit T while preventing the leak oil from entering into the dry space in which the multi-plate dry clutch 7 and the motor generator 9 are disposed.

Next, description is given of the leak oil recovery operation for the hydraulic oil leaking from the sliding part of the piston arm 83.

Some of the hydraulic oil enters into the sliding part of the piston arm 83, and leaks into the tightly sealed space formed by the partition elastic member (the pressure plate 88 and the elastic support plate 89). If the centrifugal force acts on the leak oil leaking into the tightly sealed space, the leak oil passes through the leak oil passage 32 penetrating the clutch cover 6 and flows into the first recovery oil passage 33 formed of the gap between the cylinder housing 81 and the clutch cover 6. Then, the centrifugal force moves the leak oil in the outside diameter direction through the first recovery oil passage 33, and then returns the leak oil to the transmission unit T through the second recovery oil passage 34 formed in the cylinder housing 81.

Therefore, the leak oil from the sliding part of the piston arm 83 can be recovered to the transmission unit T while preventing the leak oil from entering into the dry space in which the multi-plate dry clutch 7 and the motor generator 9 are disposed.

[Bearing Lubrication Operation]

In the case of the hybrid driving force transmission device of the embodiment, the needle bearing 20, the first bearings 12, 12 and the needle bearing 87 are set as the bearings. Since a large force acts on these bearings during driving involving repetitions of the engaging and disengaging of the multi-plate dry clutch 7, bearing lubrication is required to suppress generation of friction heat and to exert smooth support action. Hereinafter, description is given of a bearing lubrication operation to lubricate the respective bearings 20, 12, 12, 87 set in the wet space in the hybrid driving force transmission device.

When bearing lubricating oil is produced by the transmission unit T during driving or the like, the bearing lubricating oil passes through the first shaft center oil passage 19, the second shaft center oil passage 18, the gap 17 and the needle bearing 20 as indicated by the solid arrow in FIG. 2. Thereafter, the bearing lubricating oil passes through the lubricating oil passage 16 from the gap sealed by the second seal member 14, and then the flow passage is divided into two passages at about the exit of the lubricating oil passage 16. In one of the passages, the oil is returned to the transmission unit T through the first bearings 12, 12. In the other passage, the oil is returned to the transmission unit T through the needle bearing 87, the first recovery oil passage 33 formed between the cylinder housing 81 and the clutch cover 6 and sealed by the first seal member 31, and the second recovery oil passage 34 formed in the cylinder housing 81.

Therefore, the bearing lubricating oil produced by the transmission unit T can lubricate the needle bearing 20, the first bearings 12, 12 and the needle bearing 87 while preventing the oil from entering into the dry space in which the multi-plate dry clutch 7 and the motor generator 9 are disposed. Furthermore, the configuration described above uses the leak oil recovery passage in returning the bearing lubricating oil to the transmission unit T. Thus, not only the bearing lubrication configuration can be simplified, but also the leak oil from the sliding part of the piston 82 can be readily recovered, together with the bearing lubricating oil, to the transmission unit T.

Next, effects are described.

The hybrid driving force transmission device of the embodiment can achieve the following effects.

(1) The driving force transmission device includes: a driving source (the engine E); a clutch unit (the motor clutch unit MC) coupled to the driving source (the engine E), and including a clutch (the multi-plate dry clutch 7) configured to connect or disconnect driving force transmitted from the driving source (the engine E), and a hydraulic cylinder (the slave cylinder 8) configured to hydraulically control the engaging and disengaging of the clutch (the multi-plate dry clutch 7); and a transmission unit T coupled to the clutch unit (the motor clutch unit MC), and including a transmission housing 41, a transmission mechanism (the V-belt type continuously variable transmission mechanism 42) built in the transmission housing 41, and a hydraulic source (the oil pump OP) configured to generate a hydraulic pressure to required portions. The driving force transmission device further includes: a cylinder housing 81 provided in the clutch unit (the motor clutch unit MC) and having a first hydraulic passage (the first clutch pressure oil passage 85) to the hydraulic cylinder (the slave cylinder 8); and a hydraulic part (the end plate 45) provided in the transmission unit T and having a second hydraulic passage (the second clutch pressure oil passage 47) brought into communication with the first hydraulic passage (the first clutch pressure oil passage 85) in the cylinder housing 81 by coupling the clutch unit (the motor clutch unit MC) thereto.

Thus, the hydraulic pressure of the transmission unit T can be supplied to the clutch unit (the motor clutch unit MC) by means of a simple configuration without the need to provide a hydraulic source specifically for the clutch unit (the motor clutch unit MC).

(2) The clutch (the multi-plate dry clutch 7) includes a clutch hub 3 coupled to a driving source output shaft (the engine output shaft 1) of the driving source (the engine F), a first friction engaging element (the drive plate 71) held by the clutch hub 3, a clutch cover 6 coupled to a transmission input shaft 5 of the transmission unit T, and a second friction engaging element (the driven plate 72) held by the clutch cover 6. In the clutch unit (the motor clutch unit MC), the clutch (the multi-plate dry clutch 7) is disposed at a position adjacent to the driving source (the engine E) and across the clutch cover 6, and the hydraulic cylinder (the slave cylinder 8) is disposed at a position adjacent to the transmission unit T and across the clutch cover 6.

Thus, in addition to the effect (1) described above, the hydraulic cylinder (the slave cylinder 8) of the clutch unit (the motor clutch unit MC) can be coupled to the hydraulic part (the end plate 45) in the transmission unit T at the connection between the clutch unit (the motor clutch unit MC) and the transmission unit T with a simple configuration.

(3) The transmission unit T is attached to the transmission housing 41, and has a clutch unit case 46 having an opening 48 at a connection with the clutch unit (the motor clutch unit MC), and the clutch unit (the motor clutch unit MC) and the transmission unit T are coupled to allow the cylinder housing 81 in the clutch unit (the motor clutch unit MC) to serve as a cover member to close the opening 48 in the transmission unit T.

Thus, in addition to the effect (1) or (2), an additional part to close the opening 48 in the transmission unit T no longer needs to be provided, and thus the configuration of the transmission unit T can be simplified and the dimensions in the axial direction can be reduced.

Moreover, in addition to using the cylinder housing 81 as the cover member of the transmission unit T as described above, a wall part, on the transmission unit T side, of the cylinder housing 81 is used as a part of a baffle plate for the driven side sprocket 52 and the chain 53. The baffle plate in the embodiment is a part disposed adjacent to the driven side sprocket 52 and the chain 53 so as to cover these parts, and configured to prevent lubricating oil from flowing into the periphery of the driven side sprocket 52 and the chain 53 while the oil pump OP is driven by the driving force from the chain 53. Such a baffle plate allows the lubricating oil to keep away from the periphery of the driven side sprocket 52 and the chain 53 as much as possible during the driving of the oil pump OP. As a result, agitation of the lubricating oil by the driven side sprocket 52 or the chain 53 can be eliminated, and thus air bubbles can be prevented from being mixed into the lubricating oil.

To be more specific, as shown in FIG. 1, a baffle plate 58 covering the driven side sprocket 52 and the chain 53 in the vicinity thereof is fixed to the transmission housing 41. The baffle plate 58 has a cutout formed therein, and the wall part of the cylinder housing 81 on the transmission unit T side is inserted into the cutout. Thus, the wall part of the cylinder housing 81 on the transmission unit T side is disposed in the vicinity of the driven side sprocket 52 and the chain 53, and the wall part of the cylinder housing 81 on the transmission unit T side functions as a part of the baffle plate. By using the wall part of the cylinder housing 81 as a part of the baffle plate and using the wall part of the cylinder housing 81 and the baffle plate 58 to form the entire baffle plate, the dimensions in the axial direction can be reduced.

(4) The clutch unit (the motor clutch unit MC) includes: a piston 82 slidable in a cylinder hole 80 formed in the cylinder housing 81; a piston arm 83 disposed between the piston 82 and the multi-plate dry clutch, and provided slidably in a through-hole 61 formed in the clutch cover 6 in such a manner as to generate a pressing force toward the multi-plate dry clutch by using the pressure from the piston 82; a partition elastic member (the pressure plate 88 and the elastic support plate 89) disposed between the piston arm 83 and the multi-plate dry clutch and configured to block leak oil from a sliding part of the piston arm 83 from flowing into the multi-plate dry clutch; a first seal member 31 disposed downstream of the partition elastic member in the flow direction of the leak oil, and configured to tightly seal between opposed faces of the cylinder housing 81 and the clutch cover 6; and a leak oil recovery passage (the first recovery oil passage 33 and the second recovery oil passage 34) using a gap formed between the cylinder housing 81 and the clutch cover 6 as a part of the recovery passage, and configured to carry at least the leak oil from the sliding part of the piston 82 into the transmission unit T while maintaining a tightly sealed state by the partition elastic member and the first seal member 31.

Thus, in addition to the effects (1) to (3) described above, a leak oil recovery passage can be easily set, which is configured to recover leak oil from a hydraulic actuator (the piston 82 and the piston arm 83) configured to activate the clutch (the multi-plate dry clutch 7) and to return the leak oil to the transmission unit T.

While the driving force transmission device of the present invention has been described above based on the embodiment, the specific configuration is not limited to that of the embodiment, but changes in design, additions and the like can be made without departing from the spirit of the invention as defined in the appended claims.

Although the description was given of the example where the multi-plate dry clutch is used as the dry clutch in the embodiment, any other hydraulically-actuated clutch such as a single-plate dry clutch may also be used.

Although the description was given of the example of the normal open dry clutch in the embodiment, a normal-closed dry clutch using a diaphragm spring or the like may also be used.

Moreover, in the embodiment, the description was given of the example where the present invention is applied to the hybrid driving force transmission device including the engine and the motor generator, and using the clutch as a drive mode transition clutch. However, the present invention is also applicable to an engine driving force transmission device equipped with only an engine as a driving source and using a movement starting clutch. Also, the present invention is also applicable to a motor driving force transmission device equipped with only a motor generator as a driving source and using a movement starting clutch. In short, the present invention is applicable to any driving force transmission device having a clutch provided upstream of a transmission unit, the clutch being operated by a hydraulic actuator.

INDUSTRIAL APPLICABILITY

The driving force transmission device according to the present invention enables the hydraulic pressure of the transmission unit to be supplied to the clutch unit by means of a simple configuration without the need to provide a hydraulic source specifically for the clutch unit.

The invention claimed is:

1. A driving force transmission device comprising:
a driving source;
a clutch unit including a clutch coupled to the driving source and being capable of connecting or disconnecting transmission of driving force from the driving source, and a hydraulic cylinder configured to hydraulically control the engaging and disengaging of the clutch;
a transmission unit coupled to the clutch unit, and including a transmission housing, a transmission mechanism built in the transmission housing, and a hydraulic source configured to generate a hydraulic pressure to required portions;
a cylinder housing provided in the clutch unit and having a first hydraulic passage to the hydraulic cylinder; and
a hydraulic part provided in the transmission unit and having a second hydraulic passage configured to be brought into communication with the first hydraulic passage in the cylinder housing by coupling the clutch unit thereto, wherein
the cylinder housing is a stationary member including a cylinder oil chamber that is an oil chamber of the hydraulic cylinder,
the cylinder oil chamber and the first hydraulic passage communicate with each other in the cylinder housing, and
the cylinder housing and the hydraulic part are brought into close contact with each other to bring the first hydraulic passage and the second hydraulic passage into communication with each other.

2. A driving force transmission device comprising:
a driving source;
a clutch unit including a clutch coupled to the driving source and being capable of connecting or disconnecting transmission of driving force from the driving source, and a hydraulic cylinder configured to hydraulically control the engaging and disengaging of the clutch;
a transmission unit coupled to the clutch unit, and including a transmission housing, a transmission mechanism built in the transmission housing, and a hydraulic source configured to generate a hydraulic pressure to required portions;
a cylinder housing provided in the clutch unit and having a first hydraulic passage to the hydraulic cylinder; and
a hydraulic part provided in the transmission unit and having a second hydraulic passage configured to be brought into communication with the first hydraulic passage in the cylinder housing by coupling the clutch unit thereto, wherein
the clutch includes a clutch hub coupled to a driving source output shaft of the driving source, a first friction engaging element held by the clutch hub, a clutch cover coupled to a transmission input shaft of the transmission unit, and a second friction engaging element held by the clutch cover, and
in the clutch unit, the clutch is disposed at a position adjacent to the driving source across the clutch cover, and the hydraulic cylinder is disposed at a position adjacent to the transmission unit across the clutch cover.

3. The driving force transmission device according to claim 2, wherein
the transmission unit includes a clutch unit case attached to the transmission housing, and having an opening at a connection with the clutch unit, and
the clutch unit and the transmission unit are coupled to allow the cylinder housing of the clutch unit to serve as a cover member to close the opening in the transmission unit.

4. The driving force transmission device according to claim 3, wherein
the clutch unit includes
a piston slidably in a cylinder hole formed in the cylinder housing,
a piston arm disposed between the piston and the clutch, and provided slidably in a through-hole formed in the clutch cover in such a manner as to generate a pressing force toward the clutch by using the pressure from the piston,
a partition elastic member disposed between the piston arm and the clutch and configured to block leak oil from a sliding part of the piston arm from flowing into the clutch,
a seal member disposed downstream of the partition elastic member in the flow direction of the leak oil, and configured to tightly seal between opposed faces of the cylinder housing and the clutch cover, and a leak oil recovery passage using a gap formed between the cylinder housing and the clutch cover as a part of the recovery passage, and configured to carry at least the leak oil from the sliding part of the piston into the transmission unit through the connection between the cylinder housing and the hydraulic part while maintaining a tightly sealed state by the partition elastic member and the seal member.

5. The driving force transmission device according to claim 2, wherein the clutch unit includes a piston slidable in a cylinder hole formed in the cylinder housing, a piston arm disposed between the piston and the clutch, and provided slidably in a through-hole formed in the clutch cover in such a manner as to generate a pressing force toward the clutch by using the pressure from the piston, a partition elastic member disposed between the piston arm and the clutch and configured to block leak oil from a sliding part of the piston arm from flowing into the clutch, a seal member disposed downstream of the partition elastic member in the flow direction of the leak oil, and configured to tightly seal between opposed faces of the cylinder housing and the clutch cover, and a leak oil recovery passage using a gap formed between the cylinder housing and the clutch cover as a part of the recovery passage, and configured to carry at least the leak oil from the sliding part of the piston into the transmission unit through the connection between the cylinder housing and the hydraulic part while maintaining a tightly sealed state by the partition elastic member and the seal member.

\* \* \* \* \*